(12) United States Patent
Fukuyama et al.

(10) Patent No.: US 8,423,162 B2
(45) Date of Patent: *Apr. 16, 2013

(54) CONTROL METHOD FOR INFORMATION PROCESSING SYSTEM, INFORMATION PROCESSING SYSTEM, AND PROGRAM

(75) Inventors: Masayuki Fukuyama, Yokohama (JP); Jun Nakayama, Fujisawa (JP); Kouji Masuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/285,064

(22) Filed: Oct. 31, 2011

(65) Prior Publication Data
US 2012/0047395 A1 Feb. 23, 2012

Related U.S. Application Data

(63) Continuation of application No. 12/392,094, filed on Feb. 24, 2009, now Pat. No. 8,074,098.

(30) Foreign Application Priority Data

Apr. 23, 2008 (JP) ................................ 2008-113042

(51) Int. Cl.
*G05B 9/02* (2006.01)
(52) U.S. Cl.
USPC .................... 700/79; 700/21; 714/3; 711/162
(58) Field of Classification Search .................... 700/21, 700/79, 82; 714/3, 4, 11, 14; 711/162
See application file for complete search history.

(56) References Cited

U.S. PATENT DOCUMENTS

| 4,377,000 | A | * | 3/1983 | Staab .............................. 714/55 |
| 4,958,270 | A | * | 9/1990 | McLaughlin et al. .......... 700/82 |
| 5,136,498 | A | * | 8/1992 | McLaughlin et al. .......... 700/79 |
| 6,275,953 | B1 | * | 8/2001 | Vahalia et al. ................... 714/11 |
| 6,625,750 | B1 | * | 9/2003 | Duso et al. ....................... 714/11 |
| 6,820,098 | B1 | * | 11/2004 | Ganesh et al. ......................... 1/1 |
| 6,823,477 | B1 | * | 11/2004 | Cheng et al. .................... 714/26 |
| 6,832,298 | B2 | * | 12/2004 | Fujii et al. ...................... 711/147 |
| 7,076,691 | B1 | * | 7/2006 | Dobberpuhl et al. ........... 714/13 |
| 7,159,234 | B1 | * | 1/2007 | Murphy et al. ................. 725/87 |
| 7,287,187 | B2 | * | 10/2007 | Williams et al. ................ 714/14 |

(Continued)

FOREIGN PATENT DOCUMENTS

| JP | 2005301488 | 10/2005 |
| JP | 2006163969 | 6/2006 |

(Continued)

*Primary Examiner* — Mohammad Ali
*Assistant Examiner* — Anthony Whittington
(74) *Attorney, Agent, or Firm* — Brundidge & Stanger P.C.

(57) ABSTRACT

An information processing system including a plurality of server apparatuses coupled to one another, wherein failover is executed. A management server is coupled to the server apparatuses, and is configured to, when detecting occurrence of a failure in an active server apparatus, execute failover from the active server apparatus to a standby server apparatus after turning on a power supply of the standby server apparatus. The management server is enabled to acquire information on the standby server apparatus after turning on the power supply of the standby server apparatus, turn off the power supply of the standby server apparatus after acquiring the information, and, based on the acquired information, judge whether failover to the standby server apparatus can be executed.

8 Claims, 15 Drawing Sheets

U.S. PATENT DOCUMENTS

| | | | |
|---|---|---|---|
| 7,293,194 B2 * | 11/2007 | Kawamura et al. | 714/4.11 |
| 7,313,722 B2 * | 12/2007 | Saika | 714/10 |
| 7,318,107 B1 * | 1/2008 | Menon | 709/239 |
| 7,320,083 B2 * | 1/2008 | Davies et al. | 714/3 |
| 7,478,263 B1 * | 1/2009 | Kownacki et al. | 714/4.11 |
| 7,516,353 B2 * | 4/2009 | Hatasaki et al. | 714/3 |
| 7,536,576 B2 * | 5/2009 | Shima et al. | 713/340 |
| 7,562,247 B2 * | 7/2009 | Baker et al. | 714/2 |
| 7,603,423 B2 * | 10/2009 | Ito et al. | 709/206 |
| 7,711,979 B2 * | 5/2010 | Salli | 714/4.1 |
| 7,802,127 B2 * | 9/2010 | Katano et al. | 714/3 |
| 8,074,098 B2 * | 12/2011 | Fukuyama et al. | 714/4.11 |
| 2003/0079093 A1 * | 4/2003 | Fujii et al. | 711/147 |
| 2003/0149750 A1 | 8/2003 | Franzenburg | 709/220 |
| 2004/0015668 A1 * | 1/2004 | McBrearty et al. | 711/163 |
| 2005/0097394 A1 * | 5/2005 | Wang et al. | 714/11 |
| 2005/0204183 A1 * | 9/2005 | Saika | 714/4 |
| 2005/0267963 A1 | 12/2005 | Baba et al. | |
| 2006/0025871 A1 * | 2/2006 | Khalil et al. | 700/21 |
| 2006/0129772 A1 * | 6/2006 | Kawamura et al. | 711/162 |
| 2006/0136686 A1 * | 6/2006 | Cherkauer et al. | 711/162 |
| 2006/0143498 A1 | 6/2006 | Hatasaki et al. | |
| 2006/0190760 A1 * | 8/2006 | Saika | 714/4 |
| 2006/0253725 A1 * | 11/2006 | Chen et al. | 714/4 |
| 2007/0143374 A1 * | 6/2007 | D'Souza et al. | 707/204 |
| 2007/0150526 A1 * | 6/2007 | D'Souza et al. | 707/203 |
| 2007/0168058 A1 * | 7/2007 | Kephart et al. | 700/82 |
| 2007/0244937 A1 * | 10/2007 | Flynn et al. | 707/204 |
| 2008/0005614 A1 * | 1/2008 | Lubbers et al. | 714/11 |
| 2009/0158081 A1 * | 6/2009 | Dake et al. | 714/3 |
| 2009/0271654 A1 | 10/2009 | Fukuyama et al. | |

FOREIGN PATENT DOCUMENTS

| | | |
|---|---|---|
| JP | 2007164305 | 6/2007 |
| JP | 2007164394 | 6/2007 |
| JP | 2007183701 | 7/2007 |

* cited by examiner

CONFIGURATION MANAGEMENT TABLE 330

| SERVER APPARATUS IDENTIFIER | POWER SUPPLY STATUS | SERVER APPARATUS CONFIGURATION | PERMISSIBLE FUNCTION | ALLOCATED AREA | STANDBY SERVER FLAG | CHECK REQUIREMENT FLAG | SERVER STATUS | SERVER LAST POWER-OFF TIME-AND-DATE |
|---|---|---|---|---|---|---|---|---|
| HOST1 | ON | CPU1 | 1 | - | 0 | 0 | NORMAL | - |
|  |  | MEM1 | 1 | - |  |  |  |  |
|  |  | HBA1 |  | LU1 |  |  |  |  |
|  |  | NIC1 |  | - |  |  |  |  |
| HOST2 | ON | CPU2 |  |  | 0 | 0 | NORMAL | - |
|  |  | MEM1 | 2 |  |  |  |  |  |
|  |  | HBA1 |  | LU2 |  |  |  |  |
|  |  | NIC1 |  | - |  |  |  |  |
| HOST3 | ON | CPU1 |  | - | 0 | 0 | NORMAL | - |
|  |  | MEM2 |  | - |  |  |  |  |
|  |  | HBA1 |  | LU3 |  |  |  |  |
|  |  | HBA2 |  | LU4 |  |  |  |  |
|  |  | NIC1 |  | - |  |  |  |  |
| HOST4 | OFF | CPU1 |  | - | 1 | 1 | NORMAL | 2008/1/31 01:21 |
|  |  | MEM1 |  | - |  |  |  |  |
|  |  | HBA1 |  | - |  |  |  |  |
|  |  | NIC1 |  | - |  |  |  |  |
| HOST5 | OFF | CPU2 |  | - | 1 | 0 | NORMAL | 2008/2/2 01:29 |
|  |  | MEM1 |  | - |  |  |  |  |
|  |  | HBA1 |  | - |  |  |  |  |
|  |  | NIC1 |  | - |  |  |  |  |
| HOST6 | OFF | CPU1 |  | - | 1 | 0 | ABNORMAL | 2008/2/3 01:35 |
|  |  | MEM2 |  | - |  |  |  |  |
|  |  | HBA1 |  | - |  |  |  |  |
|  |  | HBA2 |  | - |  |  |  |  |
|  |  | NIC1 |  | - |  |  |  |  |
| HOST7 | OFF | CPU1 |  | - | 1 | 0 | NORMAL | 2008/2/2 01:51 |
|  |  | MEM3 |  | - |  |  |  |  |
|  |  | HBA1 |  | - |  |  |  |  |
|  |  | HBA2 |  | - |  |  |  |  |
|  |  | NIC1 |  | - |  |  |  |  |

FIG. 4A

CONFIGURATION COMPARISON TABLE 340

| SERVER APPARATUS IDENTIFIER (411) | POWER SUPPLY STATUS (412) | SERVER APPARATUS CONFIGURATION (413) | ALLOCATED AREA (415) |
|---|---|---|---|
| HOST1 | ON | CPU1 | - |
| | | MEM1 | - |
| | | HBA1 | LU1 |
| | | NIC1 | - |
| HOST2 | ON | CPU2 | |
| | | MEM1 | |
| | | HBA1 | LU2 |
| | | NIC1 | - |
| HOST3 | ON | CPU1 | - |
| | | MEM2 | - |
| | | HBA1 | LU3 |
| | | HBA2 | LU4 |
| | | NIC1 | - |
| HOST4 | OFF | CPU1 | - |
| | | MEM1 | - |
| | | HBA1 | - |
| | | NIC1 | - |
| HOST5 | OFF | CPU2 | - |
| | | MEM1 | - |
| | | HBA1 | - |
| | | NIC1 | - |
| HOST6 | OFF | CPU1 | - |
| | | MEM2 | - |
| | | HBA1 | - |
| | | HBA2 | - |
| | | NIC1 | - |
| HOST7 | OFF | CPU1 | - |
| | | MEM3 | - |
| | | HBA1 | - |
| | | HBA2 | - |
| | | NIC1 | - |

FIG. 4B

PERMISSIBLE-FUNCTION TABLE 350

| PERMISSIBLE TYPE (421) | CPU (422) | MEM (423) | HBA (424) | NIC (425) |
|---|---|---|---|---|
| 1 | FREQUENCY DIFFERENCE (UNRESTRICTED) | CAPACITY DIFFERENCE A (500M OR LESS) | SPEED DIFFERENCE (UNRESTRICTED) | TRANSFER SPEED DIFFERENCE (100M, 1G) |
| 2 | CACHE DIFFERENCE (UNRESTRICTED) | CAPACITY DIFFERENCE B (1G OR LESS) | PATH WIDTH DIFFERENCE (UNRESTRICTED) | WITHIN STANDARDS |
| 3 | FSB DIFFERENCE (UNRESTRICTED) | CHIP SPECIFICATION DIFFERENCE | ADAPTOR STANDARD DIFFERENCE | NO JUMBO FRAME |
| 4 | DIFFERENCE IN NUMBER OF CORES (UNRESTRICTED) | - | ADAPTOR STANDARD GROUP DIFFERENCE | NO IPV6 |
| 5 | TYPE DIFFERENCE | - | - | NO WAKE ON LAN |
| ⋮ | ⋮ | ⋮ | ⋮ | ⋮ |

FIG. 4C

CONTROL METHOD FOR INFORMATION PROCESSING SYSTEM, INFORMATION PROCESSING SYSTEM, AND PROGRAM

CROSS-REFERENCE TO RELATED APPLICATIONS

The present application is a continuation of application Ser. No. 12/392,094, filed Feb. 24, 2009, now U.S. Pat. No. 8,074,098; which claims a priority from Japanese Patent Application No. 2008-113042 filed on Apr. 23, 2008, the content of which herein incorporated by reference.

BACKGROUND OF THE INVENTION

1. Field of the Invention

The present invention relates to a control method for an information processing system, an information processing system, and a program. Particularly, the present invention relates to techniques for ensuring reliability and availability of an information processing system including a plurality of server apparatuses coupled to one another when failover is carried out therein.

2. Related Art

Japanese Patent Application Laid-open Publication No. 2006-163963 discloses that: in a computer system including a plurality of servers coupled to an external disk system on a network, occurrence of a failure in an active server is detected, a reserved server having the same configuration as the active server is searched for, and access to the external disk system from the reserved server is enabled, whereby operations of the active server are taken over by the reserved server.

Japanese Patent Application Laid-open Publication No. 2005-301488 discloses an input/output interface switch (hereinafter referred to as I/O switch) which, in a computer apparatus including a plurality of CPUs and a plurality of input/output interfaces, can arbitrarily set a coupling relation of the CPUs with the input/output interfaces.

In such a computer system as described in Japanese Patent Application Laid-open Publication No. 2006-163963, a power supply to a server apparatus (hereinafter referred to as standby server apparatus) set on standby to replace a server apparatus (hereinafter referred to as active server apparatus) which is currently active is kept off for such purposes as power consumption saving while the standby server apparatus is on standby.

Consequently, it is not until failover is carried out that a fact that a failure has occurred in the standby server apparatus, a fact that a configuration, a capability or the like of the standby server apparatus is insufficient to be a destination of the is failover of the active server apparatus, or the like are found out, for example. Thereby, in some cases, troubles have arisen in operations and services.

Particularly, it is considered that, if such an I/O switch as disclosed by Japanese Patent Application Laid-open Publication No. 2005-301488 is introduced to the information processing system, which enables flexible changes in configuration of an information processing system, reliability and availability of the information processing system will be highly likely to be deteriorated.

SUMMARY OF THE INVENTION

The present invention is made in view of the aforementioned background. An object of the present invention is to provide a control method for an information processing system, an information processing system, and a program which are capable of ensuring reliability and availability of an information processing system when failover is carried out therein.

One example of the present invention for achieving the above object is a management method of an information processing system including an active server apparatus and a standby server apparatus coupled to one another, and a management server coupled to the active server apparatus and to the standby server apparatus, which after turning on a power supply to the standby server apparatus, performs a failover from the active server apparatus to the standby server apparatus when detecting an occurrence of a failure in the active server apparatus. In the method, the management server turns on the power supply to the standby server apparatus, and acquires information on the standby server apparatus, turns off the power supply to the standby server apparatus after acquiring the information, and judges, based on the acquired information, whether or not failover to the standby server apparatus is possible.

Other issues such as problems disclosed in the present specification and means for the solving problems will become apparent from reading through the description of the preferred embodiments together with the accompanying drawings.

According to the present invention, when failover is carried out in an information processing system including a plurality of server apparatuses coupled to one another, reliability and availability thereof can be ensured.

BRIEF DESCRIPTION OF THE DRAWINGS

FIG. 4A is an example of a configuration management table 330;

FIG. 4B is an example of a configuration comparison table 340;

FIG. 4C is an example of an permissible-function table 350;

DETAILED DESCRIPTION OF THE INVENTION

Figure 1:
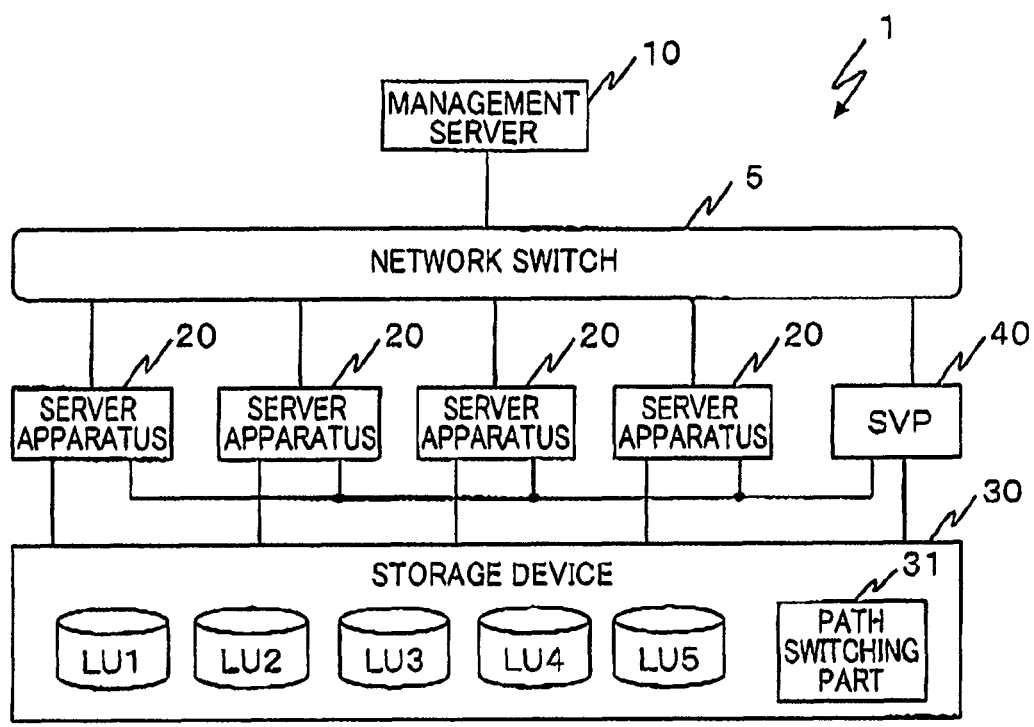
FIG. 1 is a configuration diagram of an information processing system 1 described as an embodiment.

Hereinafter, an embodiment of the present invention will be described by use of the accompanying drawings. FIG. 1 shows a configuration of an information processing system 1 described as one embodiment of the present invention. As shown in FIG. 1, the information processing system 1 is provided with a network switch 5, a management server 10, a plurality of server apparatuses 20, a storage system 30 and an SVP 40 (where SVP stands for SerVice Processor). Note that, as an example of the information processing system 1 shown in FIG. 1 is a blade server including a plurality of blades implemented therein which correspond to the server apparatuses 20.

The management server 10 is coupled through the network switch 5 to the server apparatuses 20 and the SVP 40. Additionally, each of the server apparatuses 20 and the SVP 40 are coupled to each other.

The SVP 40 can start and stop operations of each of the server apparatuses 20. The server apparatus 20 starts operating, for example, with its power supply being turned on. Additionally, the server apparatus 20 stops operating, for example, with its power supply being turned off, or by being shut down.

Figure 2A:
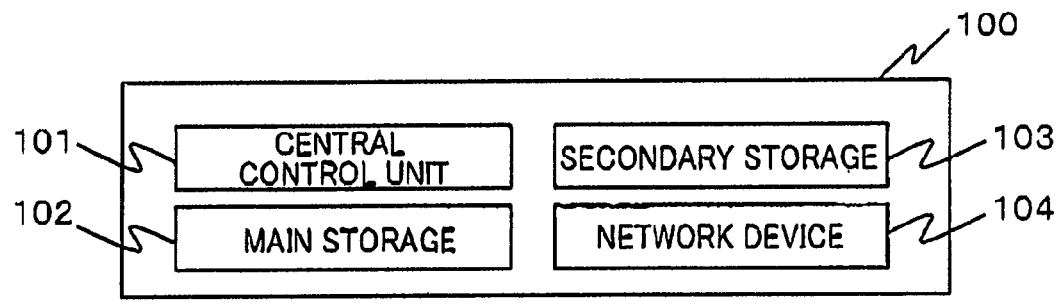
FIG. 2A is an example of hardware of a management server 10.

The management server 10 is, for example, a computer (an information processing apparatus) including hardware shown in FIG. 2A. The computer 100 shown in FIG. 2A is provided with a central control unit 101 (which is a central processing unit (CPU), a micro processing unit (MPU) or the like), a main storage 102 (which is a random access memory (RAM), a read only memory (ROM) or the like), a secondary storage 103 (which is a hard disk, a CD, a DVD or the like) and a network device 104 (which is a network interface card (NIC) or the like).

Figure 2B:
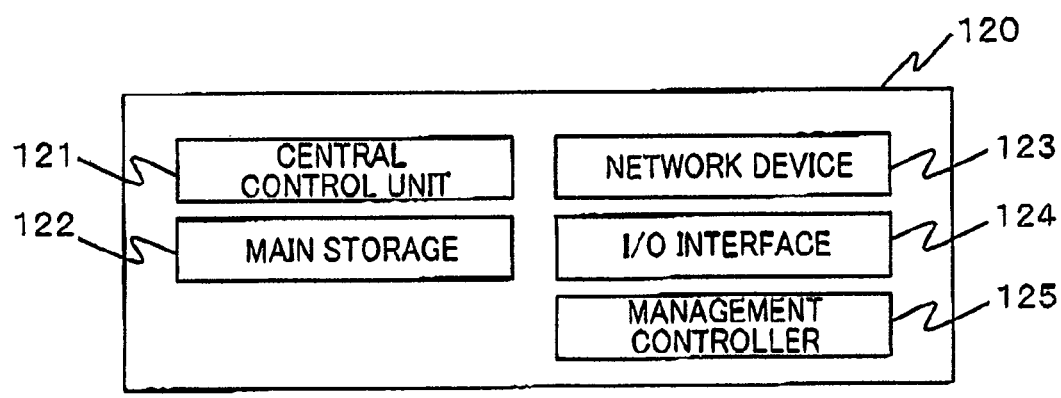
FIG. 2B is an example of hardware of a server apparatus 20.

On the other hand, the server apparatus 20 is, for example, a computer including hardware shown, for example, in FIG. 2B. The computer 120 shown in FIG. 2B is provided with a central control unit 121 (which is a CPU, an MPU or the like), a main storage 122 (which is a RAM, a ROM or the like), a network device 123 (which is a NIC or the like), an I/O interface 124 and a management controller 125.

The I/O interface 124 is an interface provided for communicating with the storage device 30. An example of this interface is a NIC if communications between a server apparatus 20 and the storage device are performed through a local area network (LAN); or a host bus adapter (HBA) if the communications are performed through a storage area network (SAN).

The management controller 125 is a device including a function of monitoring, independently from software operating on the server apparatus 20, statuses of the hardware in the server apparatus 20. This device is, for example, a baseboard management controller (BMC). The management controller 125 notifies an operating system, which operates on the server apparatus 20, and the SVP 40 on an occurrence of a hardware error. Examples of such hardware errors include an abnormality in supply voltage of a power supply, an abnormality in rotation speed of a cooling fan, and abnormalities in temperature or power supply voltage of various devices.

Upon receipt of an instruction to start or stop the operation of the server apparatus 20, the management controller 125 causes the server apparatus 20 to start or stop operating in response thereto. Note that the management controller 125 can operate independently from the other constituents of the server apparatus 20 such as the central control unit 121 and the main storage 122, and can notify the management server 10 and the SVP 40 on an occurrence of a failure independently from the other constituents.

The storage device 30 is a memory device such as, for example, a disk array device. The storage device 30 provides data storage areas to the server apparatuses 20. In this embodiment, the storage device 30 provides storage areas to the server apparatuses in units of logical devices (in logical units (LUs)). Additionally, in response to an instruction issued by the management server 10, the storage device 30 sets a physical or logical route (path) coupling each of the server apparatuses 20 to corresponding one of the LUs. Hereinafter, this function will be referred to as a path switching part 31.

Figure 3A:
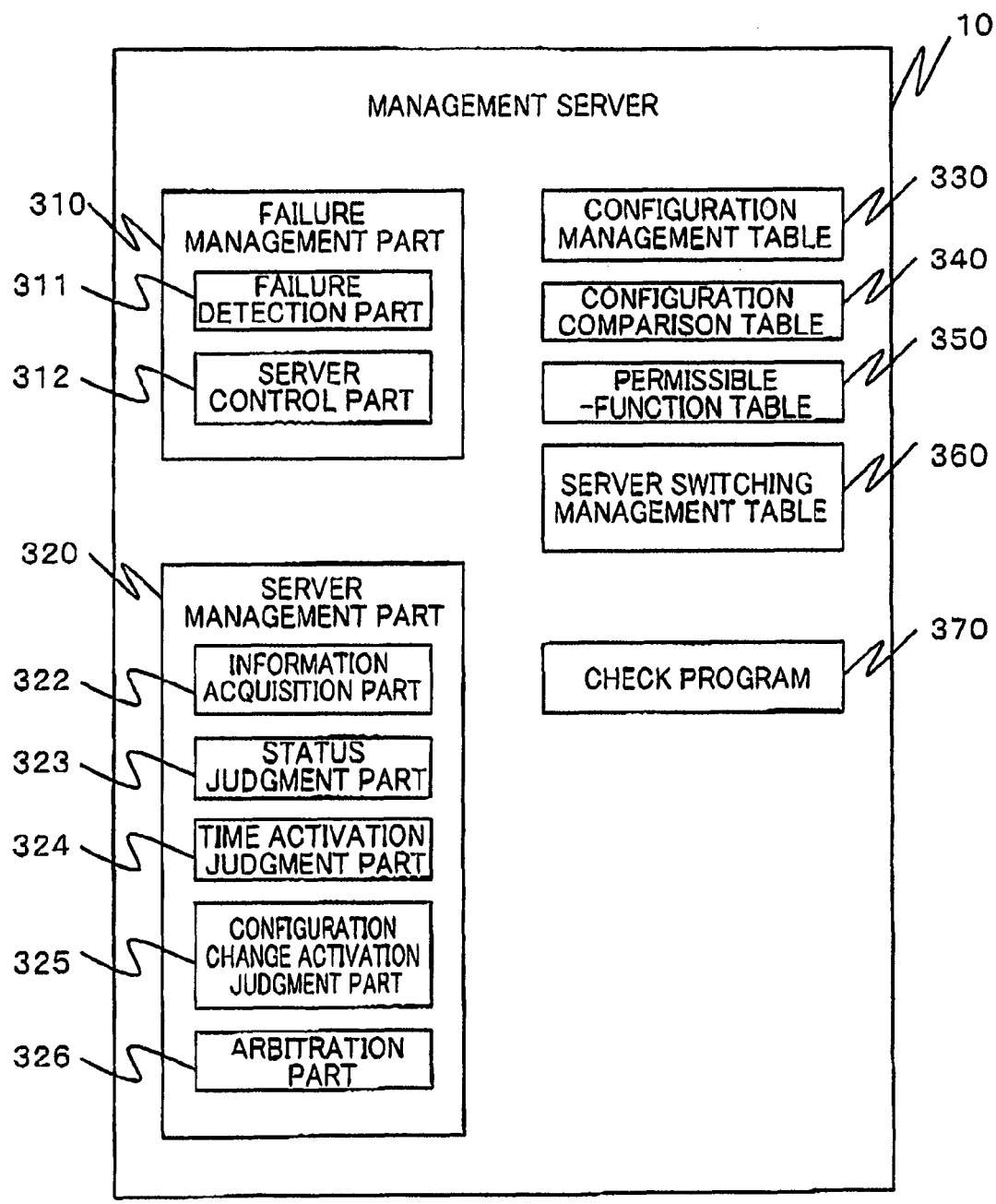
FIG. 3A is a diagram showing functions and data included in the management server 10.

In FIG. 3A, functions included in the management server 10, and data retained by the management server 10 are shown. As the functions, the management server 10 includes a failure management part 310 and a server management part 320. These functions are realized by hardware included in the management server 10, or by causing the central control unit 103 to read and execute a program stored in the main storage 102 or in the second storage 103.

The failure management part 310 includes a failure detection part 311 and a server control part 312. The failure management part 310 monitors, in real time, presence or absence of a failure in a currently active server apparatus 20 (hereinafter referred to as an active server apparatus 20 in some cases). When having detected a failure, the failure management part 310 performs so-called failover where operations and services having been performed by the active server apparatus are taken over by another server apparatus 20 (hereinafter referred to as a standby server apparatus 20 in some cases).

The server management part 320 collects information on the server apparatuses 20 (including statuses of power supplies of the server apparatuses 20, configurations included in the server apparatuses 20, LUs allocated to the server apparatuses 20, presence or absence of an abnormality in each of the server apparatuses 20, times and dates of the last power-off of the server apparatuses 20, and the like), and manages the collected information by storing it in a configuration management table 330 to be described later. As shown in FIG. 3A, the server management part 320 includes an information acquisition part 322, a status judgment part 323, a time activation judgment part 324, and a configuration change activation judgment part 325 and an arbitration part 326.

The management server 10 stores therein a configuration management table 330, a configuration comparison table 340, a permissible-function table 350 and a server switching management table 360 as shown in FIG. 3A. Additionally, the management server 10 stores therein a check program 370.

Figure 3B:
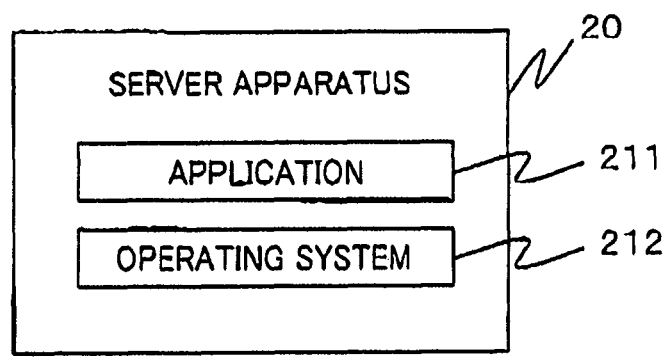
FIG. 3B is a diagram showing a software configuration of the server apparatus 20.

In FIG. 3B, a software configuration of the server apparatus 20 is shown. As shown in FIG. 3B, an operating system 212 and various application programs 211 operate in the server apparatus 20.

FIG. 4A is one example of the configuration management table 330 stored in the management server 10. As shown in this drawing, the configuration management table 330 includes therein items being Server Apparatus Identifier 401, Power Supply Status 402, Server Apparatus Configuration 403, Permissible Function 404, Allocated Area 405, Standby Server Flag 406, Check Requirement Flag 407, Server Status 408, and Server Last Power-off Time-and-Date 409. In the Server Apparatus Identifier 401 among these items, identifiers assigned uniquely to the respective server apparatuses 20 are set. In the Power Supply Status 402, current statues (ON or OFF) of power supply activation of the server apparatuses 20 are set. In the Server Apparatus Configuration 403, constituents, such as a CPU, a memory (MEM), an HBA and a NIC, of the server apparatus 20 are set.

In the Permissible Function 404, permissible types to be described later are set, the permissible types being pieces of information indicating specifications (functions and capabilities) required for each of the standby server apparatuses 20 which is set on standby to replace any one of the active server apparatuses 20. In the Allocated Area 405, identifiers of logical units (LUs) allocated to the respective server apparatuses 20 are set. In the Standby Server Flag 406, "1" is set to the server apparatuses 20 that are standby server apparatuses 20, and "0" is set to the others that are not standby server apparatuses 20. In the Check Requirement Flag 407, "1" is set to the server apparatuses 20 that require to be checked, and "0" is set to the others that do not require to be checked. In the Server Status 408, "normal" is set to the server apparatuses 20 that are operating normally, and "abnormal" is set to the others that are not operating normally. In the Server Last Power-off Time-and-Date 409, the last power-off time and date of the respective server apparatuses 20 is set.

FIG. 4B is one example of the configuration comparison table 340 stored in the management server 10. The configuration comparison table 340 includes items being Server Apparatus Identifier 411, Power Supply Status 412, Server Apparatus Configuration 413, and Allocated Area 415. Note that meanings of the respective items are the same as those of corresponding items in the configuration management table 330 which have the same titles. In the configuration comparison table 340, information on the server apparatuses 20 to be later reflected to the configuration management table 330 is temporarily stored.

FIG. 4C is one example of the permissible-function table 350 stored in the management server 10. In the permissible-function table 350, the permissible range of functions, which should be satisfied by the respective standby server apparatuses 20 so as to become failover destinations of corresponding ones of the active server apparatuses 20, are registered by type. As shown in FIG. 4C, the permissible-function table 350 includes items being Permissible Type 421, CPU 422, MEM 423, HSA 424 and NIC 425. In Permissible Type 421 among these, permissible types are set, the permissible types indicating pieces of information which are assigned to the respective types of the permissible range. In CPU 422, the permissible range of specifications required for CPUs in the standby server apparatuses are set. In MEM 423, the permissible range of specifications required for the main storages 122 (memories) in the standby server apparatuses 20 are set. In HBA 424, the permissible range of specifications required for the I/O interfaces 124 (HBAs) are set. In NIC 425, the permissible range of specifications required for the I/O interfaces 124 (NICs) are set.

Figure 4D:
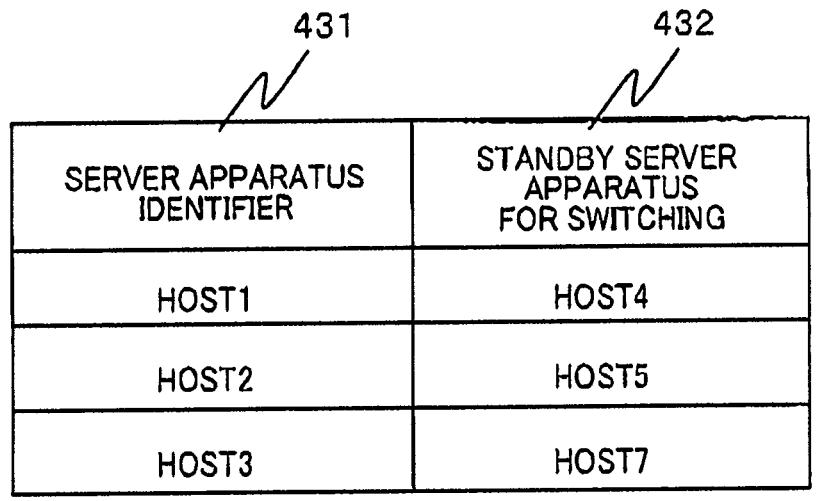
FIG. 4D is an example of a server switching management table 360.

FIG. 4D is one example of the server switching management table 360 stored in the management server 10. As shown in FIG. 4D, the server switching management table 360 includes items being Server Apparatus Identifier 431, and Standby Server Apparatus for Switching 432. In Server Apparatus Identifier 431, identifiers of the server apparatuses 20 are set. In the Standby Server Apparatus for Switching 432, identifiers of the standby server apparatuses 20 that are to be failover destinations of the respective server apparatuses 20 are set. The way of allocating, to the respective sever apparatuses 20, the server apparatuses 20 that are to be the failover destinations from the respective server apparatuses is determined in compliance with, for example, an operation policy of the information processing system 1. Note that, depending on the operation policy, there may be: a case (a one-to-many configuration) where plurality of server apparatuses 20 are set as the standby server apparatuses 20 for a single active server apparatus 20; and a case (a many-to-one configuration) where a single server apparatus 20 is set as the standby server apparatus 20 for a plurality of the active server apparatuses 20.

The check program 370 shown in FIG. 3A is a program executed on each of the server apparatuses 20. The check program 370 transmits information on each of the server apparatuses 20 (type of device, operational status, and the like) to the SVP 40 or the management server 10.

Description of Operations

Next, specific operations of the information processing system 1 will be described in connection with a flowchart. Note that, in the following description, the character "S" prefixed to reference numerals indicates "step."

Figure 5:
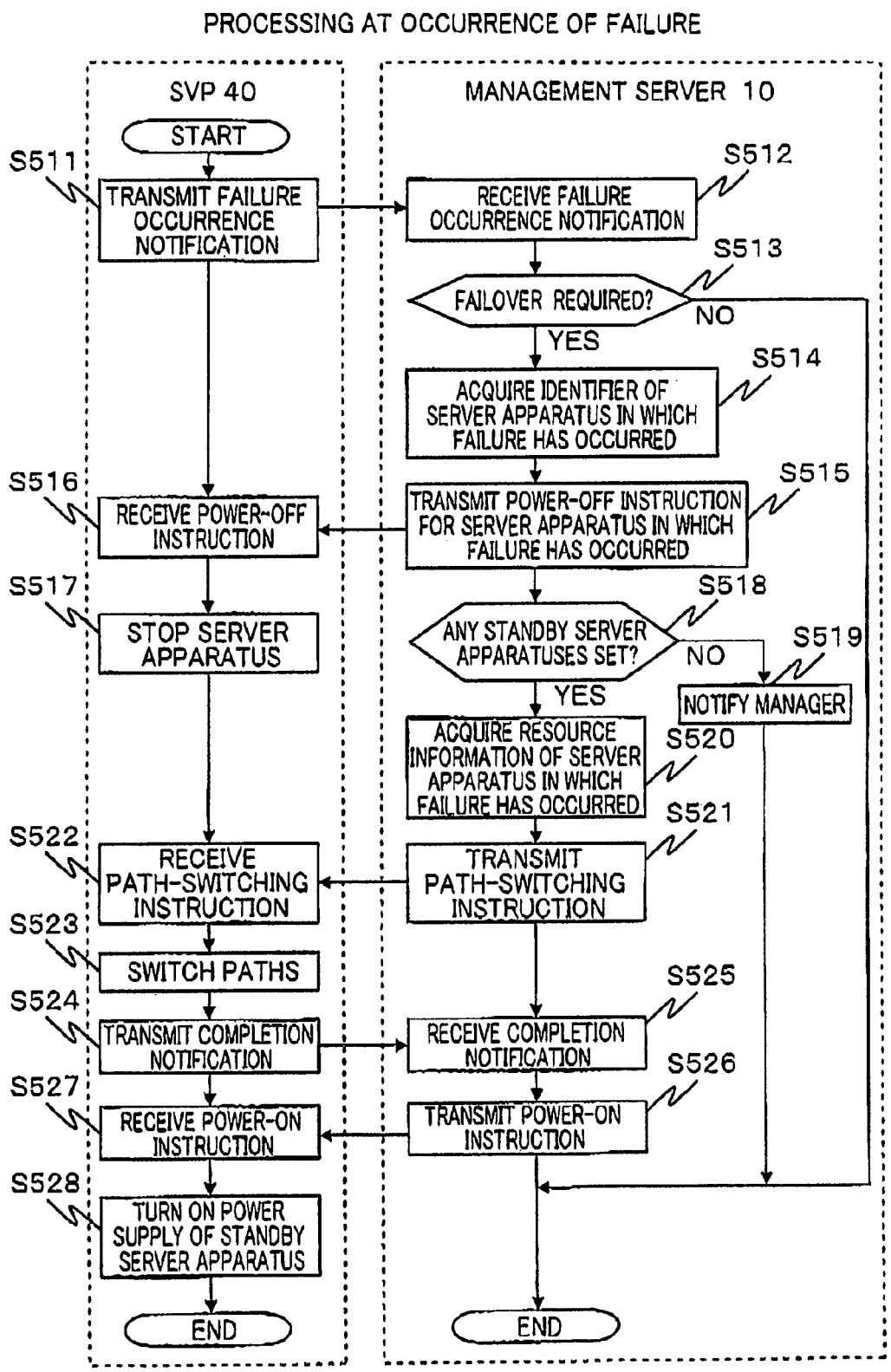
FIG. 5 is a flowchart showing operations of the information processing system 1 when failover is carried out.

FIG. 5 is a flowchart showing operations of the information processing system 1 when a failure occurs in the active server apparatus 20 and failover is performed therein. Hereinafter, description will be given in connection with this drawing.

When a failure occurs in any one of the active server apparatuses 20, the SVP 40 detects its occurrence, and a failure occurrence notification is transmitted to the management server 10 from the SVP 40 (S511).

Upon receiving the failure occurrence notification (S512), the failure detection part 311 in the management server 10 judges whether or not it is necessary to carry out failover (S513). This judgment is implemented by, for example, judging whether or not this failure is a failure within the active server apparatuses 20.

If the failure detection part 311 judges that it is necessary to carry out failover (YES in S513), the processing proceeds to S514, whereas, if it judges that it is not necessary (No in S513), the processing is ended.

In S514, the server control part 312 acquires an identifier (an identifier of the server apparatus 20, which is contained in the failure occurrence notification that the failure detection part 311 has received in S512) of the active server apparatus 20 in which the failure has occurred.

In S515, the server control part 312 transmits to the SVP 40 an instruction to turn off a power supply of the active server apparatus 20 in which the failure has occurred (S515). After receiving the above instruction (S516), the SVP 40 turns off a power supply of the appropriate one of the server apparatuses 20 (S517).

In S518, with reference to the server switching management table 360, the server control part 312 judges whether or not any standby server apparatus 20 has been set for the active server apparatus 20 in which the failure has occurred. If no standby server apparatus 20 has been set on standby to replace the above active server apparatus 20 (NO in S518), the server control part 312 notifies a manager that a failover cannot be carried out (S519) Note that this notification is made, for example, through an output to a display or a printer, or through an e-mail. On the other hand, if any standby server apparatuses 20 has been set (YES in S518), the processing proceeds to S520.

In S520, the server control part 312 acquires, from the configuration management table 330, resource information (corresponding to, for example, contents set in Allocated Area 440 and Server Apparatus Configuration 403 in the configuration management table 330) on the active server apparatus 20 in which the failure has occurred.

In S521, the server control part 312 transmits to the SVP 40 an instruction (hereinafter referred to as path-switching instruction) to switch, to appropriate one of the standby server apparatuses 20, a path having been allocated to the active server apparatus 20 in which the failure has occurred.

After receiving the path-switching instruction (S522), the SVP 40 causes the path switching part 31 included in the storage device 30 to perform the path switching (S523). For example, in a case where the I/O interfaces 124 of the server apparatuses 20 are HBAs, the path switching is implemented by assigning, to the HBA of the appropriate standby server apparatus 20, a world wide name (WWN) having been assigned to the HBA of the active server apparatus 20 in which the failure has occurred. After completion of the path switching, a completion notification is transmitted to the management server 10 from the SVP 40 (S524).

After receiving the completion notification (S525), the management server 10 transmits to the SVP 40 an instruction (hereinafter referred to as power-on instruction) to turn on a power supply of the appropriate standby server apparatus 20 (S526) After receiving the power-on instruction (S527), the SVP 40 turns on the power supply of the appropriate standby server apparatus 20 (S528).

These are the operations of the information processing system 1 when failover is carried out.

Next, in connection with flowcharts shown in FIGS. 6A to 6C, description will be given of processing (hereinafter referred to as check processing) in which the management server 10 checks the server apparatuses 20. Here, it is assumed that the server apparatus 20 (hereinafter referred to as an acquisition target apparatus) whose information is to be acquired is specified before the check processing shown in FIG. 6A is started, and that the management server 10 has acquired an identifier of the acquisition target apparatus before then.

Figure 6A:
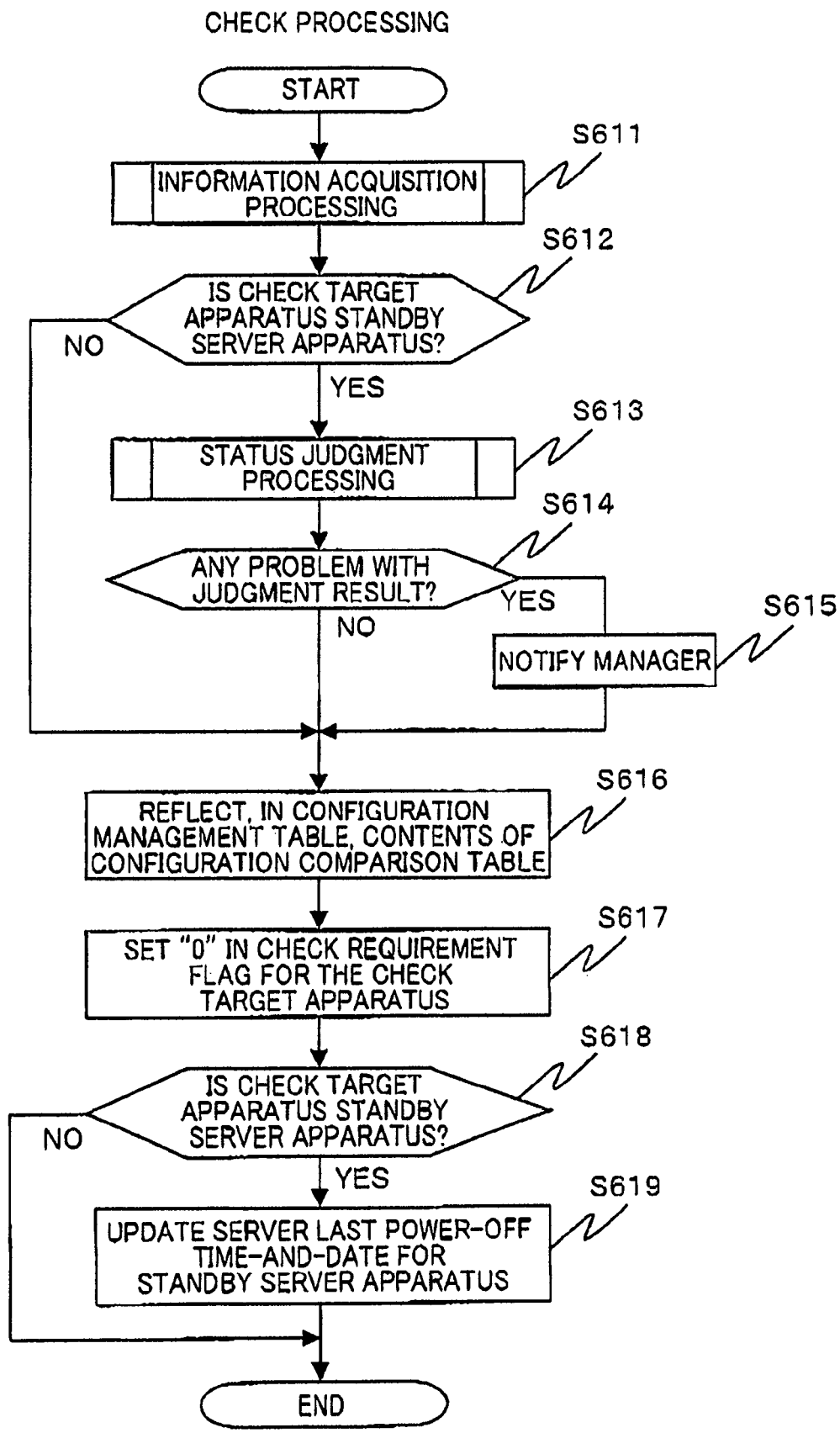
FIG. 6A is a flowchart describing check processing.

As shown in FIG. 6A, in the check processing, first, the management server 10 acquires information on those server apparatuses 20 (this processing will be hereinafter referred to as information acquisition processing) (S611).

Figure 6B:
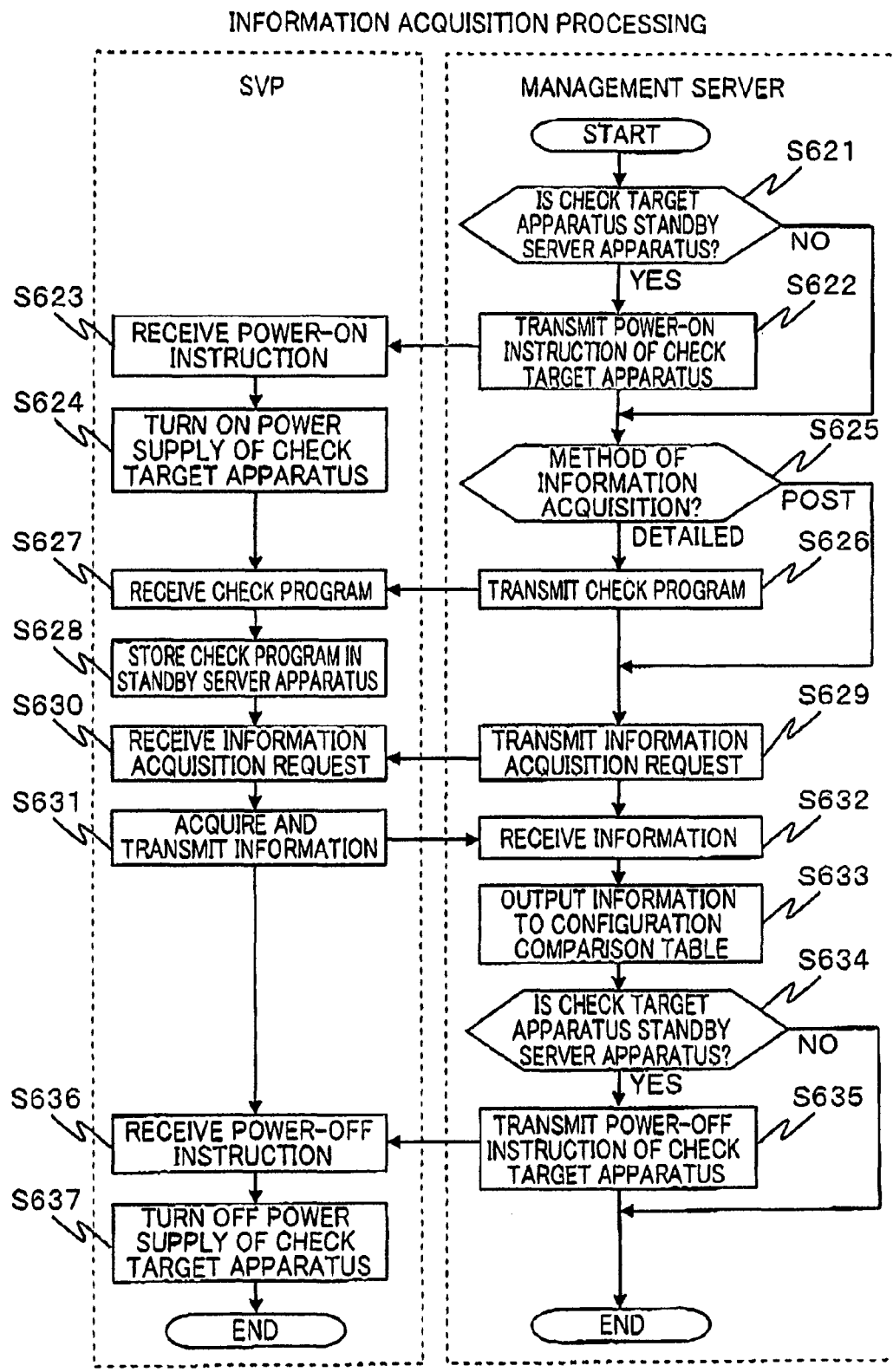
FIG. 6B is a flowchart describing information acquisition processing.

FIG. 6B is a flowchart provided for describing details of the information acquisition processing. First of all, with reference to the contents of the Standby Server Flag 406 in the configuration management table 330, the information acquisition part 322 in the server management part 320 judges whether or not a check target apparatus is the standby server apparatus 20 (S621) If the check target apparatus is the standby server apparatus 20 (YES in S621), the processing proceeds to S622. If the check target apparatus is not the standby server apparatus 20 (NO in S621), the processing proceeds to S625.

In S622, the information acquisition part 322 transmits to the SVP 40 an instruction to turn on a power supply (hereinafter referred to as power-on instruction) of the standby server apparatus 20. After receiving the power-on instruction (S623), the SVP 40 turns on the power supply of the standby server apparatus 20 which is the check target apparatus (S624).

In S625, the information acquisition part 322 determines a method for acquiring information from the server apparatuses 20. In this information processing system 1, either one of the following methods can be selected as the above method for acquiring the information. Specifically, the methods are: a method in which the information is acquired in a short period of time by use of dump information (hereinafter referred to as POST information) outputted by a basic input output system (BIOS) of an appropriate one of the server apparatuses 20 (hereinafter referred to as a first information acquisition method); and a method in which the information (hereinafter referred to as detailed information) is acquired in a long period of time through execution of the check program 370 in appropriate one of the server apparatuses 20 (hereinafter referred to as a second information acquisition method).

For example, when the check target apparatus is the standby server apparatus 20, the determination is made as to which of the information acquisition methods is selected, by examining whether or not a failover destination for the active server apparatus 20 can be secured, while the check target apparatus is being checked (for example, in a case where a plurality of standby server apparatuses 20 have been set for this active server apparatus 20, time is spent to acquire the information by use of the second information acquisition method thus selected if a failover destination thereof can be secured even after the execution of the check program 370 in one of the plurality of standby server apparatuses 20. In contrast, in a case where only one of the standby server apparatuses 20 has been set for this active server apparatus 20, the information acquisition is simply performed by use of the first information acquisition method thus selected in order to avoid a case where a failover destination cannot be secured after the execution of the check program 370 in this standby server apparatus 2.) Alternatively, the determination is made as to which of the information acquisition methods is selected in accordance with a cumulative number of times the server apparatus 20 has been checked (for example, with cumulative number of times the server apparatus 20 has been checked being managed, the information is usually acquired from the POST information using a first acquisition method, and the method is switched to the second acquisition method so that the information can be acquired from the detailed information every predetermined number of times.)

In S625, if the second information acquisition method is selected (S625: Detailed), the processing proceeds to S626, whereas, if the first information acquisition method is selected (S625: POST), the processing proceeds to S629.

In S626, the information acquisition part 322 transmits the check program 370 to the SVP 40. After receiving the check program 370 (S627), the SVP 40 stores the check program in the check target apparatus (S628). Note that, in a case where execution of the check program 370 requires a mini operating system, a mini operating system is also transmitted to the SVP 40 along with the check program 370, and is also stored in the check target apparatus Additionally note that, instead of being stored in any one of the server apparatuses 20 every time checking is performed, the check program 370 and a mini operating system may be set resident in the server apparatuses 20.

In S629, the information acquisition part 322 transmits to the SVP 40 an instruction to acquire the information (hereinafter referred to as information acquisition request). After receiving the information acquisition request (S630), the SVP 40 transmits the information (the detailed information or the POST information) to the management server 10 (S631).

In S633, the information acquisition part 322 reflects in the configuration comparison table 340 contents based on the thus acquired information.

In S634, with reference to Standby Server Flag 406 in the configuration management table 330, the information acquisition part 322 judges whether or not the check target apparatus is the standby server apparatus 20. If the check target apparatus is the standby server apparatus 20 (YES in S634), the processing proceeds to S635, whereas, if it is not the standby server apparatus 20 (NO in S634), the processing is ended (proceeds to S612 in FIG. 6A).

In S635, the information acquisition part 322 transmits to the SVP 40 an instruction to turn off a power supply (hereinafter referred to as power-off instruction) of the standby server apparatus 20. After receiving the power-off instruction (S636), the SVP 40 turns off the power supply of the standby server apparatus 20 (S637). Note that, in a case the check program 370 is used to acquire information, the check program 370 may have a function to automatically turn off the power supply of the standby server apparatus 20 after the information is acquired.

In the above described manner, information on the server apparatus 20 (the information including a configuration, an operation status and the like of the server apparatus 20) can be acquired from the server apparatus 20. Additionally, if the check target apparatus is the standby server apparatus 20, the information is firstly acquired after a power supply of the standby server apparatus 20 is turned on, and the power supply of the standby server apparatus 20 is turned off again after the information is acquired. That is, the information can be acquired from the standby server apparatus 20 whose power supply has been off. Additionally, power consumption can be saved because the power supply of the standby server apparatus 20 is turned on only during the acquisition of the information.

Additionally, the information on the sever apparatus 20 can be safely acquired because any one of the first information acquisition method and the second information acquisition method can be selected in accordance with configuration statuses of the active server apparatus 20 and the standby server apparatus 20. Moreover, when a safe condition is confirmed and the detailed information is acquired by use of the second information acquisition method, the information on the server apparatus 20 can be grasped in detail in the management server 10. Furthermore, when the detailed information is acquired from any one of the server apparatuses 20, the check program 370 is configured to be stored in the server apparatuses 20. Accordingly, the detailed information can be reliably acquired from that server apparatus 20. Additionally, resources of the server apparatuses 20 can be effectively utilized.

Description will be given with reference to FIG. 6A again. In S612, with reference to Standby Server Flag 406 in the configuration management table 330, the server manager 320 in the management server 10 judges whether or not the check target apparatus is the standby server apparatus 20. If the check target apparatus is the standby server apparatus 20 (YES in S612), the processing proceeds to S613, whereas, if the check target apparatus is not the standby server apparatus 20 (NO in S612), the processing proceeds to S616.

In S613, the status judgment part 323 of the server manager 320 judges a status of the standby server apparatus 20 (hereinafter, this processing will be referred to as status judgment processing).

Figure 6C:
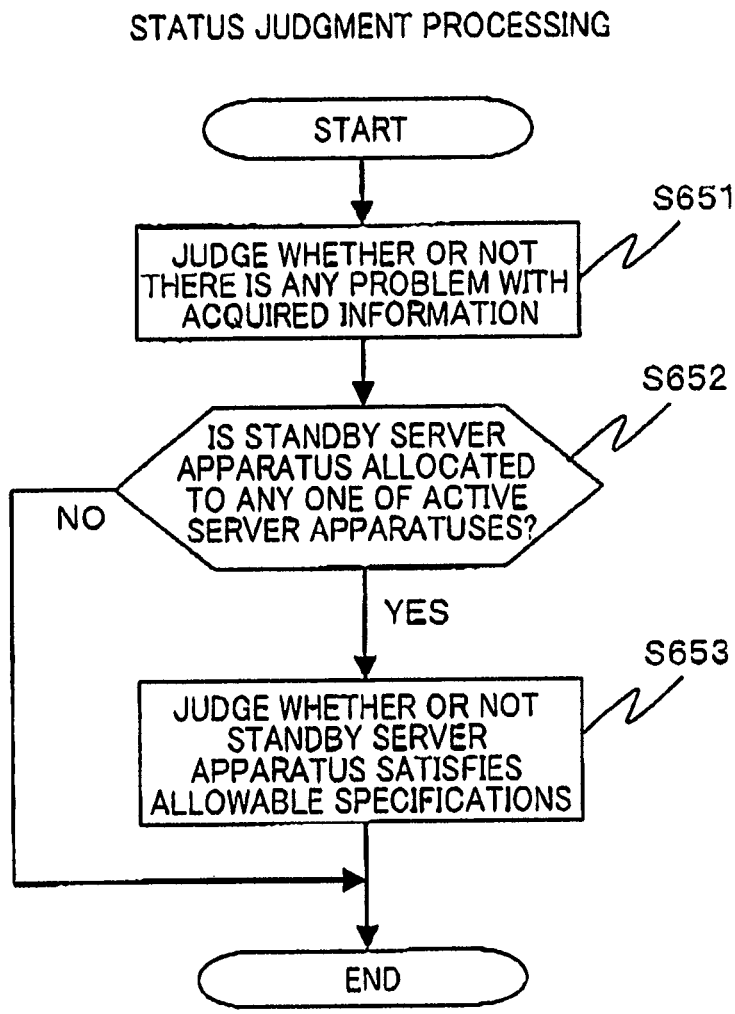
FIG. 6C is a flowchart describing status judgment processing.

FIG. 6C is a flowchart provided for describing the status judgment processing. First of all, in S651, the status judgment part 323 judges whether or not there is any failure (any failed part) in the standby server apparatus 20 which is the check target apparatus. This judgment is implemented, for example, by examining the detailed information or POST information which has been acquired by the information acquisition part 322 in S632 in FIG. 6B. Alternatively, it is implemented, for example, by comparing contents of the corresponding items in the configuration management table 330 and the configuration comparison table 340 with each other, and examining whether or not there is any difference therebetween.

In S652, with reference to the server switching management table 360, the status judgment part 323 judges whether or not there is any one of the active server apparatuses 20 that the standby server apparatus 20, which is the check target apparatus, has been set on standby to replace. If there is any one of the active server apparatuses 20 that the check target apparatus has been set on standby to replace (YES in S652), the processing proceeds to S653, whereas, if there is no active server apparatus 20 that the check target apparatus has been set on standby to replace (NO in S652), the processing is ended (the processing proceeds to S614 in FIG. 6A).

In S653, the status judgment part 323 judges whether or not the standby server apparatus 20 which is the check target apparatus satisfies specifications (in terms of configuration, performance, function and the like) required as a failover destination from the active server apparatus 20 that this standby server apparatus 20 has been set on standby to replace (S653). This judgment is implemented, for example, by examining, with reference to the permissible-function table 350, and based on comparison between a configuration, found in the configuration management table 330, of the active server apparatus 20 and a configuration, found in the configuration comparison table 340, of this standby server apparatus 20 which is the check target apparatus, whether or not functions of the standby apparatus 20 are within a permissible range specified by appropriate one of the allowable types that has been registered in Permissible Function 404 in the configuration management table 330. Note that the failover can be carried out safely and reliably by judging whether or not this standby server apparatus 20 satisfies specifications required as a destination of the failover.

Description will be given with reference to FIG. 6A again. In S614, the server management part 320 judges whether or not there is any problem with a result of the judgment made in S651 or S653 in FIG. 6C. If it is judged that there is a problem with the judgment result (YES in S614), the processing proceeds to S615, whereas, if it is judged that there is no problem (NO in S614), the processing proceeds to S616.

In S615, the management server 10 notifies the manager that there is a problem, and about the kind of problem. Note that this notification is made, for example, through an output to a display or a printer, or through an e-mail. In S616, the server management part 320 reflects contents of the configuration comparison table 340 in the configuration management table 330. In S617, the server management part 320 sets "0" in Check Requirement Flag 407 for the check target apparatus in the configuration management table 330. In S618, with reference to Standby Server Flag 406 in the configuration management table 330, the server management part 320 judges whether or not the check target apparatus is the standby server apparatus 20. If the check target apparatus is the standby server apparatus 20 (YES in S618), the processing proceeds to S619, whereas, if the check target apparatus is not the standby server apparatus 20 (NO in S618), the processing is ended. In S619, in Server Last Power-off Time-and-Date 409 in the configuration management table 330, for the standby server apparatus 20 which is the check target apparatus, the management server 10 sets the time and date (for example, present time and date) of when the standby server apparatus 20 is turned off. The check processing is implemented as described hereinabove.

Figure 7A:
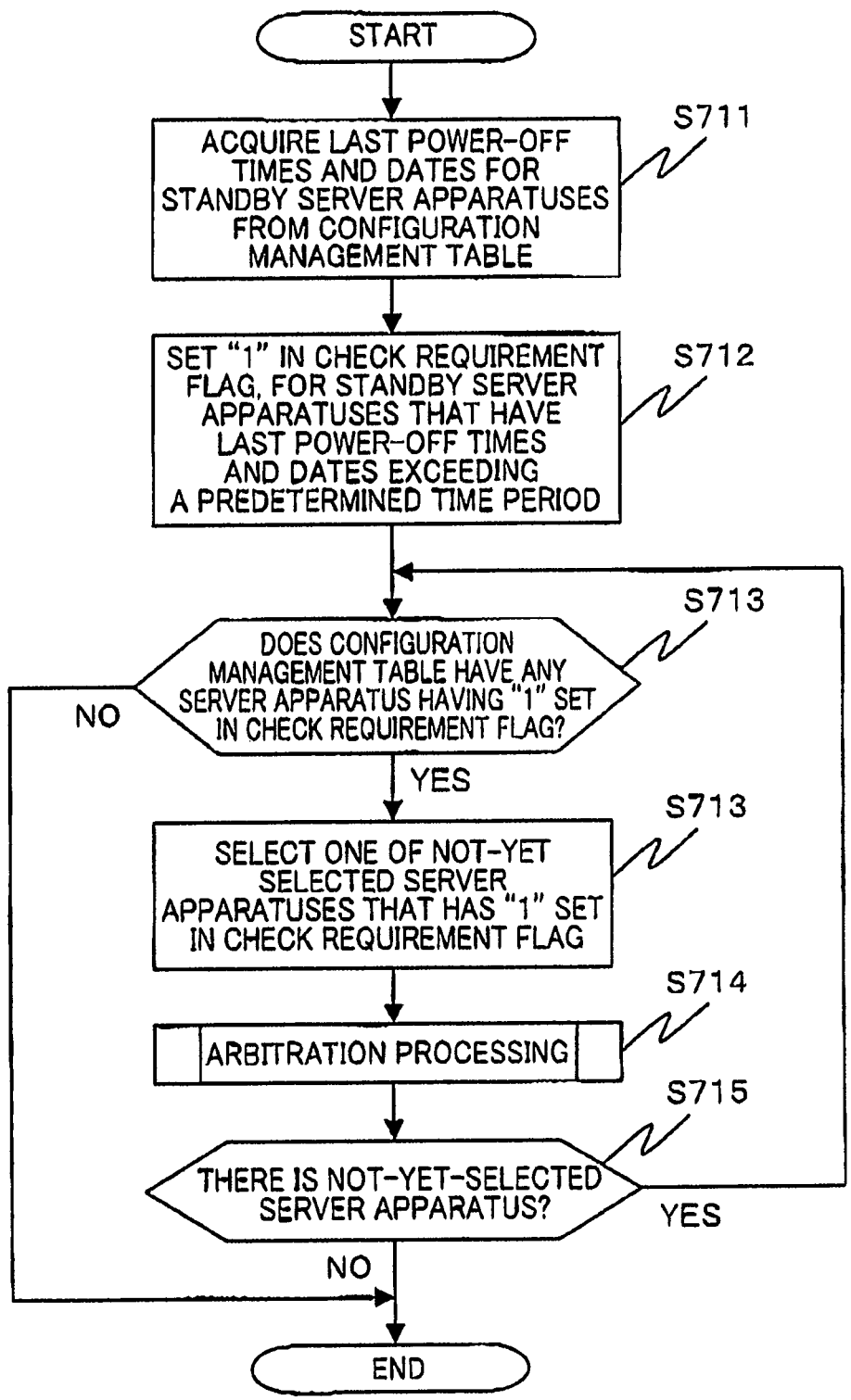
FIG. 7A is a flowchart describing time activation processing.
Figure 7B:
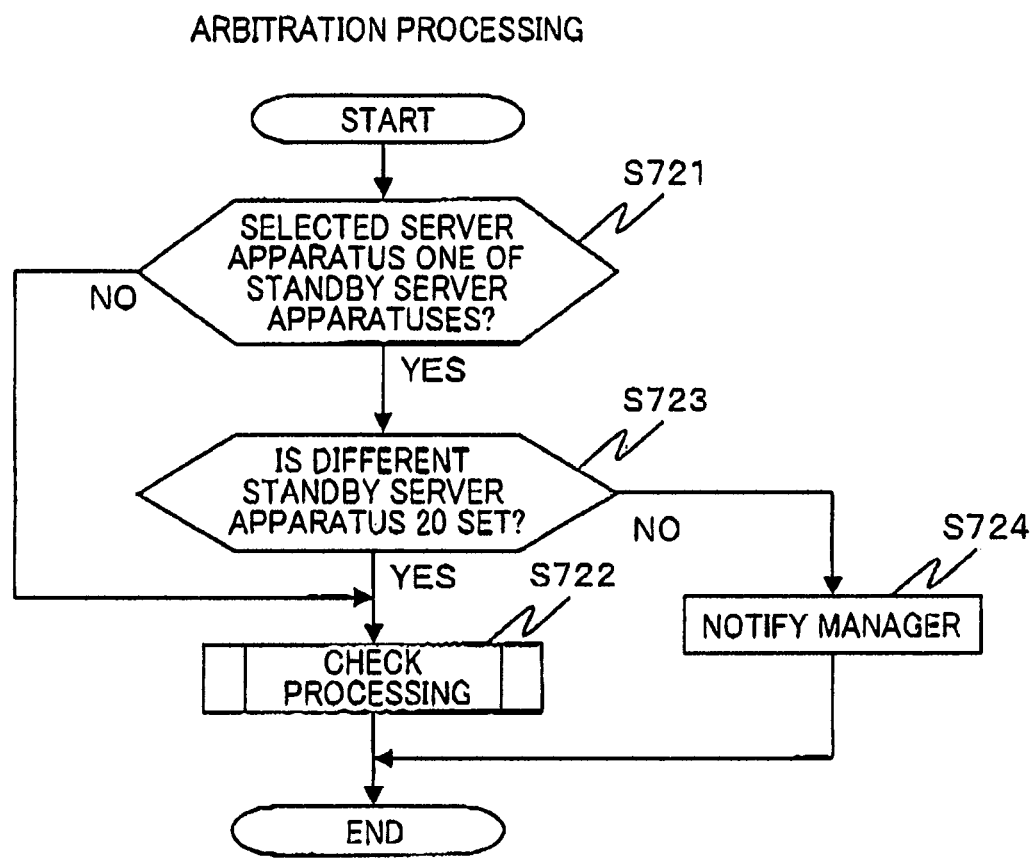
FIG. 7B is a flowchart describing arbitration processing.

FIGS. 7A and 7B are flowcharts provided for describing one example of processing (hereinafter referred to as time activation processing) with respect to activation of the above described check processing. The time activation processing will be described in connection with these drawings.

In the time activation processing, the time activation judgment part 324 of the server management part 320 firstly acquires contents (last power-off time and date) in the Server Last Power-off Time-and-Date 409 of the standby server apparatuses 20 (for which "1" has been set in Standby Server Flag 406) from the configuration management table 330 (S711).

Subsequently, by comparing the last power-off time and date acquired in S711 with the present time and date, the time activation judgment part 324 sets "1" in Check Requirement Flag 407 for those of the standby server apparatuses 20 that have the last power-off times and dates exceeding a predetermined time period (for example, one hour, one day, or the like) (S712).

In S713 that follows, the time activation judgment part 324 judges whether or not there is any one of the server apparatuses 20 that has "1" set in the Check Requirement Flag 407 in the configuration management table 330. If there is any one of the server apparatuses 20 that has "1" set in the Check Requirement Flag 407 (YES in S713), the processing proceeds to S713, whereas, if there is no server apparatus 20 that has "1," set in the Check Requirement Flag 407 (NO in S713), the processing is ended.

In S713, from the configuration management table 330, the time activation judgment part 324 selects one of not-yet selected server apparatuses 20 (server apparatuses having not been subjected yet to arbitration processing (S714) to be described later) that have "1" set in the Check Requirement Flag 407.

In S714, the management server 10 performs the arbitration processing S714. The arbitration processing S714 will be described later.

In S715, the time activation judgment part 324 judges whether or not there is any not-yet-selected one of the server apparatuses 20 that has been found in S713 to have "1" set in the Check Requirement Flag 407 (S715). If there is any not-yet-selected one (YES in S715), the processing proceeds to S713, whereas, if there is no not-yet-selected one (NO in S715), the processing is ended.

FIG. 7B is a flowchart provided for describing the arbitration processing S714. First of all, the arbitration unit 326 of the server management part 320 judges whether or not the server apparatus 20 selected in S713 has been set on standby (whether or not the server apparatus 20 selected in S713 is the standby server apparatus 20) (S721). If the server apparatus 20 has not been set on standby (NO in S721), the processing proceeds to S722, whereas, if the server apparatus 20 has been set on standby (YES in S721), the processing proceeds to S723.

In S723, with reference to the server switching management table 360, the arbitration part 326 judges whether or not there is a different server apparatus 20 that has been set on standby to replace the active server apparatus 20 that the selected server apparatus 20 is set on standby to replace. Note that this judgment is made to confirm, even when the selected server apparatus 20 is being checked, whether or not any one of the server apparatuses 20 can be secured so as to be set on standby to replace the active server apparatus 20. If there is a different one having been thus set (YES in S723), the processing proceeds to S722, whereas, if there is none having been thus set (NO in S723), the processing proceeds to S724.

In S724, the arbitration part 326 notifies the manager that the server apparatus 20 requiring to be checked cannot be checked. Note that this notification is made, for example, through an output to a display or a printer, or through an e-mail. The processing is ended thereafter. In S722, the selected standby server apparatus 20 is subjected to the above described check processing (FIGS. 6A to 6C).

Note that, in S723, even if there is different one of the server apparatuses 20 that has been thus set on standby (YES in S723), the processing may, without subjecting the selected standby server apparatus 20 to the check processing (S722), also proceed to S724 to notify the manager of the fact that the checking can not be made in cases: where the different server apparatus 20 having been thus set on standby is already being checked; where the different server apparatus 20 is waiting to be checked; and where a failure has occurred in the different server apparatus 20 (for example, where occurrence of the failure has been detected based on contents of Server Status 408 in the configuration management table 330). In any one of these cases, the check processing (S722) may be carried out after the different server apparatus 20 having been thus set on standby has finished being checked, or has recovered from the failure. The time activation processing is performed in this way.

Accordingly, contents of the configuration management table 330 can be constantly updated by having the server apparatuses 20 checked at predetermined time intervals. Thereby, a failure in the server apparatuses 20 can be reliably found at its early stage, whereby reliability and availability of the information processing system 1 can be ensured.

Figure 8:
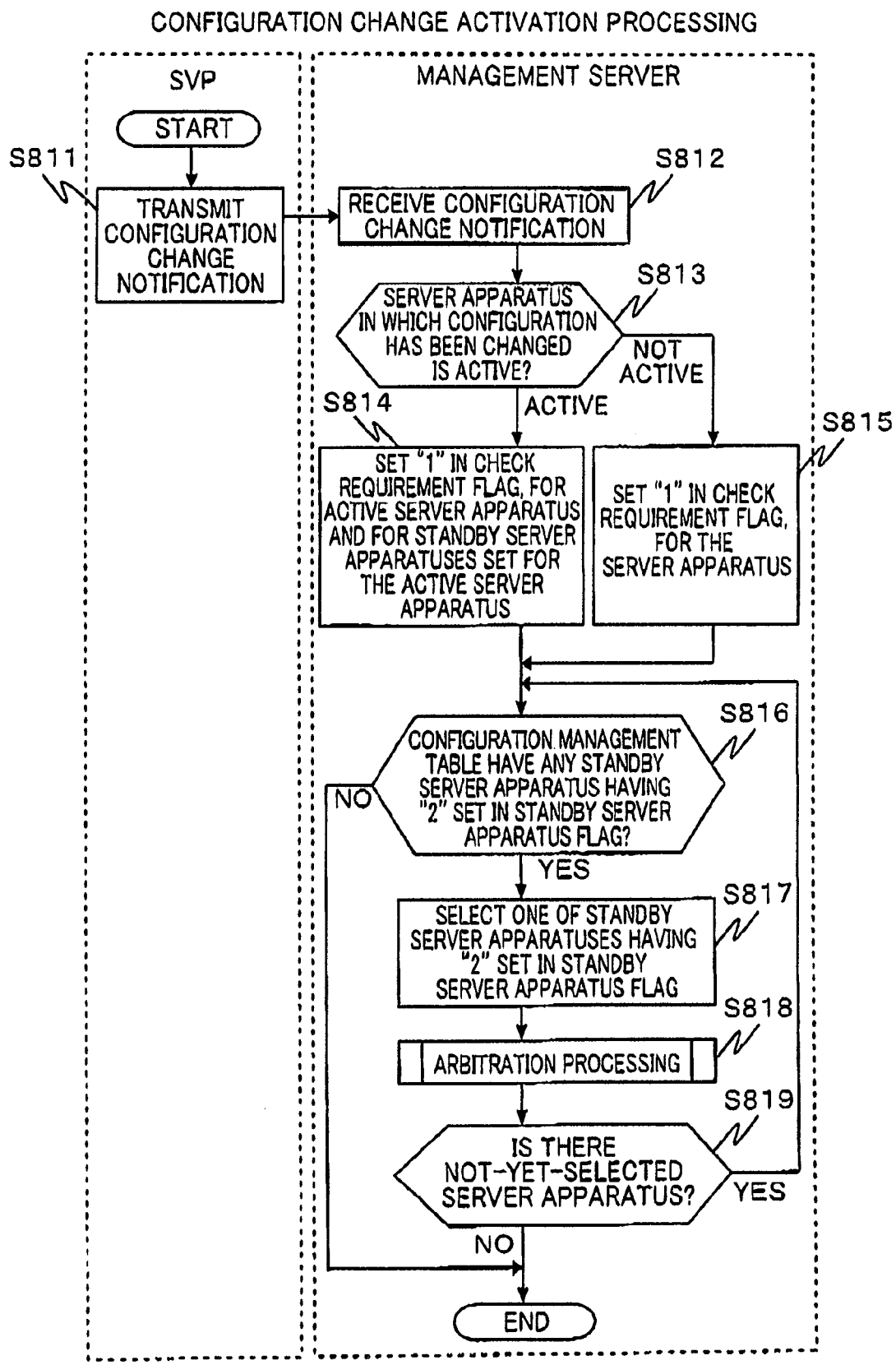
FIG. 8 is a flowchart describing configuration change activation processing.

FIG. 8 is a flowchart provided for describing another example of processing for activation of the check processing (hereinafter referred to as configuration change activation processing). With reference to FIG. 8, the configuration change activation processing will be described hereinbelow.

As shown in FIG. 8, first of all, when there is any change in, configuration of any one of the server apparatuses 20, the SVP 40 transmits a notification (hereinafter referred to as configuration change notification) about this matter to the management server 10 (S811).

After receiving the configuration change notification (S812), the configuration change activation judgment part 325 of the management server 10 judges whether or not the server apparatus 20 specified by the configuration change notification is the active server apparatus 20 (S813). Based on a result of the judgment, if the specified server apparatus 20 is the active server apparatus 20 ("active" in S813), the processing proceeds to S814, whereas, if it is not the active server apparatus 20 ("not active" in S813), the processing proceeds to S815.

In S814, the configuration change activation judgment part 325 sets "1" in Check Requirement Flag 407, for the active server apparatus 20, in the configuration management table 330. Additionally, the configuration change activation judgment part 325 sets "1" in Check Requirement Flag 407 also for those of the server apparatuses 20 that have been set on standby to replace the active server apparatus 20. Note that, when the specified server apparatus 20 is the active server apparatus 20, those of the server apparatuses 20 that have been set on standby to replace the active server apparatus is also required to be checked for the following reason. If a configuration is changed for the active server apparatus 20, it necessitates another judgment on whether or not each of those server apparatuses 20 having been set on standby to replace the active server apparatus satisfies specifications required for the active server apparatus 20.

In S815, the configuration change activation judgment part 325 sets "1" in Check Requirement Flag 407 for the specified server apparatus 20. Processing in S816 to S819 is the same as the processing in S713 to S715 in FIG. 7A. The configuration change activation processing is implemented as described above.

Accordingly, the check processing is automatically performed when there is a configuration change in any one of the server apparatuses 20. Thereby, when a failure has occurred in any one of the active server apparatuses 20, failover from the active server apparatus 20 to one of the standby server apparatuses 20 can be reliably performed, whereby reliability and availability of the information processing system 1 can be ensured.

Note that the above description of the embodiment has been given in order to facilitate understanding of the present invention, and is not intended to limit the present invention. Obviously, various modifications can be applied to the embodiment without departing from the spirit and scope of the present invention, and the present invention includes equivalents thereof.

What is claimed is:

1. A management method of an information processing system including an active server apparatus and a standby server apparatus coupled to one another, and a management server coupled to the active server apparatus and to the standby server apparatus, which after turning on a power supply to the standby server apparatus, performs a failover from the active server apparatus to the standby server apparatus when detecting an occurrence of a failure in the active server apparatus, the standby server apparatus being provided with a checking part that checks the standby server apparatus when the standby server apparatus is turned on, the management method comprising the steps of:

selecting, by the management server, the standby server apparatus based on configuration management information, the configuration management information being held in the management server and including information indicating whether or not each server apparatus coupled to the management server is the standby server apparatus, and information indicating a status of a power supply of each server apparatus coupled to the management server;

turning on the power supply to the standby server apparatus;

checking the standby server apparatus by the checking part;

requesting, by the management server, the standby server apparatus to acquire check result information by the checking part;

receiving, by the standby server apparatus, the acquired check result information;

acquiring, by the management server, the received check result information;

turning off the power supply to the standby server apparatus; and judging, based on the acquired information, whether or not the failover from the active server apparatus to the standby server apparatus is possible.

2. The management method of an information processing system according to claim 1, wherein the management server stores therein specifications required for the standby server apparatus that is set on standby to replace the active server apparatus, and wherein the management server judges that failover to the standby server is impossible in the step of judging whether or not failover to the standby server apparatus is possible, in a case where the specifications of the standby apparatus which are specified by the information acquired from the standby server apparatus do not satisfy the specifications required for the active server apparatus which the standby apparatus is on standby to replace.

3. The management method of an information processing system according to claim 1, wherein the management server stores therein time when the power supply to the standby server apparatus is turned off, and wherein the management server executes the step of:
acquiring the information, and the step of judging whether or not the failover is possible in a case where a predetermined time period has passed since the stored time.

4. The management method of an information processing system according to claim 1, wherein the management server executes the step of acquiring the information and the step of judging whether or not the failover is possible, when detecting a configuration change in the standby server apparatus.

5. The management method of an information processing system according to claim 4, wherein the management server executes the step of acquiring the information and the step of judging whether or not the failover is possible, on the active server apparatus to which the standby server apparatus configuration of which is changed is set on standby to replace, and on a different standby server apparatus that is set on standby to replace the active server apparatus.

6. The management method of an information processing system according to claim 1, wherein the management server judges whether or not a different standby server apparatus exists in the information processing system and the different standby server apparatus is further set on standby to replace the active server apparatus, and with a result of the judgment, executes the step of acquiring the information and the step of judging whether or not the failover is possible, if the judgment indicates that the different standby server apparatus exists and is set on standby.

7. An information processing system comprising:
a standby server apparatus coupled to an active server apparatus; and
a management server coupled to the active server apparatus and to the standby server apparatus, the management server after turning on a power supply to the standby server apparatus, performing a failover from the active server apparatus to the standby server apparatus when detecting an occurrence of a failure in the active server apparatus,
wherein the management server includes:
a selecting part to select the standby server apparatus based on configuration management information, the configuration management information being held in the management server and including information indicating whether or not each server apparatus coupled to the management server is the standby server apparatus, and information indicating a status of a power supply of each server apparatus coupled to the management server;
an information acquisition part to start operation of the standby server apparatus, when an operation of the same is at a stop, transmit a check program to the standby server apparatus, cause the check program to check the standby server apparatus, requests the standby server apparatus to return check result information by the check program, and acquire the check result information from the standby server apparatus;
a server control part to turn off the power supply to the standby server apparatus after acquiring the check result information; and
a status judgment part to judge, based on the acquired information, whether or not the failover from the active server apparatus to the standby server apparatus is possible.

8. A non-transitory computer-readable recording medium containing a program executed by a management server in an information processing system including an active server apparatus and a standby server apparatus coupled to one another, and a management server coupled to the active server apparatus and to the standby server apparatus, which after turning on a power supply to the standby server apparatus, performs a failover from the active server apparatus to the standby server apparatus when detecting an occurrence of a failure in the active server apparatus,
the program causing the management server to perform the steps of:

selecting the standby server apparatus based on configuration management information, the configuration management information being held in the management server and including information indicating whether or not each server apparatus coupled to the management server is the standby server apparatus, and information indicating a status of a power supply of each server apparatus coupled to the management server;

turning on the power supply, of the standby server apparatus, whose operation is at a stop, transmitting a check program to the standby server apparatus, causing the check program to check the standby apparatus, requesting the standby server apparatus to return check result information by the check program, and acquiring the check result information from the standby server apparatus;

turning off the power supply of the standby server apparatus; and judging, based on the acquired information, whether or not the failover from the active server apparatus to the standby server apparatus is possible.

* * * * *